United States Patent
Takabatake et al.

(10) Patent No.: US 6,777,626 B2
(45) Date of Patent: Aug. 17, 2004

(54) INPUT DEVICE AND PORTABLE EQUIPMENT USING THE SAME

(75) Inventors: Kenicni Takabatake, Osaka (JP); Toshiharu Fukui, Nara (JP); Kenichi Matsumoto, Osaka (JP); Koji Tanabe, Osaka (JP); Hirofumi Komiya, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/468,338

(22) PCT Filed: Oct. 11, 2002

(86) PCT No.: PCT/JP02/10593

§ 371 (c)(1),
(2), (4) Date: Aug. 18, 2003

(87) PCT Pub. No.: WO03/034455

PCT Pub. Date: Apr. 24, 2003

(65) Prior Publication Data

US 2004/0069605 A1 Apr. 15, 2004

(30) Foreign Application Priority Data

Oct. 15, 2001 (JP) ........................................ 2001-316414

(51) Int. Cl.[7] ............................................... H01H 9/00
(52) U.S. Cl. ...................... 200/5 A; 200/600; 200/512; 341/22; 341/27
(58) Field of Search ................................. 200/5 A, 600, 200/512, 310, 314, 317, 61.01; 341/22, 27

(56) References Cited

U.S. PATENT DOCUMENTS

| 4,081,631 | A |   | 3/1978  | Feder .......................... 200/5 A |
| 4,225,970 | A | * | 9/1980  | Jaramillo et al. ........... 455/90.3 |
| 5,140,632 | A | * | 8/1992  | Anten ......................... 379/447 |
| 5,416,463 | A | * | 5/1995  | Higgins et al. ......... 340/384.73 |
| 5,491,478 | A | * | 2/1996  | de la Luz et al. ............. 341/22 |
| 6,717,074 | B2 | * | 4/2004 | Lu .............................. 200/5 R |

FOREIGN PATENT DOCUMENTS

| JP | 6-177809     | 6/1994  |
| JP | 2002-281578  | 9/2002  |
| WO | 99/56199     | 11/1999 |
| WO | 00/02417     | 1/2000  |

* cited by examiner

Primary Examiner—Michael A. Friedhofer
(74) Attorney, Agent, or Firm—Wenderoth, Lind & Ponack, L.L.P.

(57) ABSTRACT

Disclosed are a compact input device that offers a wide space for input operation and portable equipment using the device. The input operation section of the input device is not only for data entry by users, but also for transmitting sound vibration. The coupling section of the device is coupled to the input operation section to form a closed cavity between the two sections. The sound vibration transmitting section, which is formed adjacent to the closed cavity, conveys sound vibration, via the closed cavity, from the input operation section to the sound vibration transmitting section (or vice versa). The portable equipment includes the aforementioned input device and a sound vibration element. In the equipment, the sound vibration element is coupled to the sound vibration transmitting section of the input device. Sound vibration is transmitted, via the closed cavity and sound vibration transmitting section of the input device, from input operation section to the vibration element (or vice versa).

12 Claims, 7 Drawing Sheets

US 6,777,626 B2

INPUT DEVICE AND PORTABLE EQUIPMENT USING THE SAME

TECHNICAL FIELD

The present invention relates to an input device used for various types of electronic equipment including portable phones and mobile communication devices. More particularly, it relates to an input device that can be used for input and output of sound, and portable equipment using the device.

BACKGROUND ART

In recent years, portable phones and mobile communication devices are getting smaller but more functional. In the wake of such a trend, an input device employed for electronic equipment has a need to handle various operations and display styles in a limited space.

An example of prior-art input device and portable equipment having the device is described with reference to FIGS. 7 and 8.

FIG. 7 is a sectional view of the essential part of a mobile phone as an example of the prior-art portable equipment.

FIG. 8 is a plan view of the mobile equipment.

In FIGS. 7 and 8, insulating resin-made housing 1 has loudspeaker 2 and input device 3 in the upper section on its surface. In the lower section of housing 1, a plurality of operation keys 4 each of which has a switch contact thereunder (not shown) and microphone 5 are arranged.

Input device 3 is known as the transparent touch panel, which contains transparent upper substrate 11, transparent lower substrate 13, and spacer 15.

Upper substrate 11 has a film or the like under which transparent upper conductive layer 12 is formed. Upper conductive layer 12 is made of indium-tin oxide, tin oxide, or the like. On the other hand, lower substrate 13 has transparent lower conductive layer 14 thereon. Picture frame-like spacer 15 has an adhesive on both surfaces. Upper substrate 11 and lower substrate 13 are bonded together via adhesive-applied spacer 15. Besides, a plurality of spacer dots 16, which are provided at spaced intervals on the upper surface of lower conductive layer 14, allow upper substrate 11 to face to lower substrate 13 at an given interval.

When a user pushes the top surface of upper substrate 11 by the finger or a pen, substrate 11 bends due to the depressing force, thereby a part of upper conductive layer 12 corresponding to the pushed position contacts with lower conductive layer 14. Upper conductive layer 12 has upper electrodes (not shown) on both ends; on the other hand, lower conductive layer 14 has lower electrodes (also not shown) on both ends orthogonal to the ends having the upper electrodes of layer 12. In response to the ratio of the resistance between the upper electrodes to the resistance between the lower electrodes, the depressed position is detected.

In addition, display element 6, such as liquid crystal display (LCD), is disposed under input device 3. The user finds, through transparent input device 3, letters, symbols, and graphical images shown on display element 6, and selects a desirable one among them. The user also operates input device 3 to switch between various functions.

In the portable equipment having such structured input device 3, the user operates keys 4 to display data, for example, names and telephone numbers, on display element 6. Further, the user selects a desired one among the names or telephone numbers listed on display element 6 and then pushes a specific key to place a call. The user thus starts a conversation using loudspeaker 2 and microphone 5.

In the portable equipment having the conventional input device, as described above, housing 1 has not only input device 3 and a plurality of operation keys 4, but also loudspeaker 2 and microphone 5 for telephone calls, and all of which is disposed on the top surface of housing 1. Accordingly, when increasing the size of input device 3 or the number of keys 4 so as to respond to more functions of equipment, the equipment becomes bigger as a whole. This makes it difficult to realize compatibility between performance improvement in equipment and downsizing of the equipment.

DISCLOSURE OF THE INVENTION

It is therefore the object of the present invention to provide an input device suitable for portable equipment having high-performance in a compact body, which can offer a wide and user-friendly space in input operation. It is also the object to provide portable equipment using the device.

The input device of the present invention has the following structure.

An input operation section is used for data entry in response to the user's operation. The input operation section also conveys sound vibration;

A coupling section is coupled to the input operation section to form a closed cavity between the two sections.

A sound vibration transmitting section, which is formed to be adjacent to the closed cavity, transmits sound vibration from the input operation section to the sound vibration transmitting section (or vice versa), via the closed cavity.

The aforementioned sound vibration transmitting section of the input device transmits, via the closed cavity, sound vibration typified by voice, which is carried from an input element for data entry or a vibration element. By virtue of the structure having the sound vibration transmitting section, the vibrating element can be arranged on the back surface or the side surface of the input element. The structure can thus offer a compact input device having a wide space for the input operation.

The portable equipment of the present invention includes the aforementioned input device and a sound vibration element.

According to the portable equipment, the sound vibration element is coupled to the sound vibration transmitting section of the input device. Sound vibration generated from the input section is transmitted to the sound vibration transmitting section, or vice versa, via the closed cavity of the input device and the sound vibration transmitting section. The portable equipment can thus offer a wide and ease-of-use space for input operation, even though its compact body.

DETAILED DESCRIPTION OF THE PREFFERED EMBODIMENTS

The exemplary embodiments of the present invention are described hereinafter with reference to the accompanying drawings, FIG. 1 through FIG. 6.

(First Exemplary Embodiment)

Figure 1:
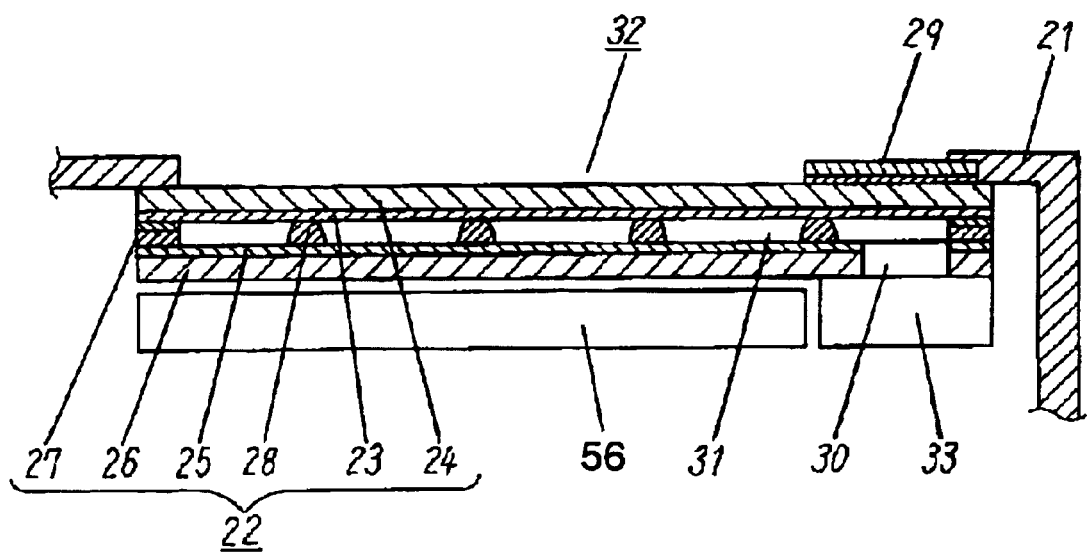
FIG. 1 is a sectional view illustrating the essential part of the portable equipment of a first embodiment of the present invention.

FIG. 1 is a sectional view illustrating the essential part of a mobile phone as an example of portable equipment in accordance with a first embodiment of the present invention.

Figure 2:
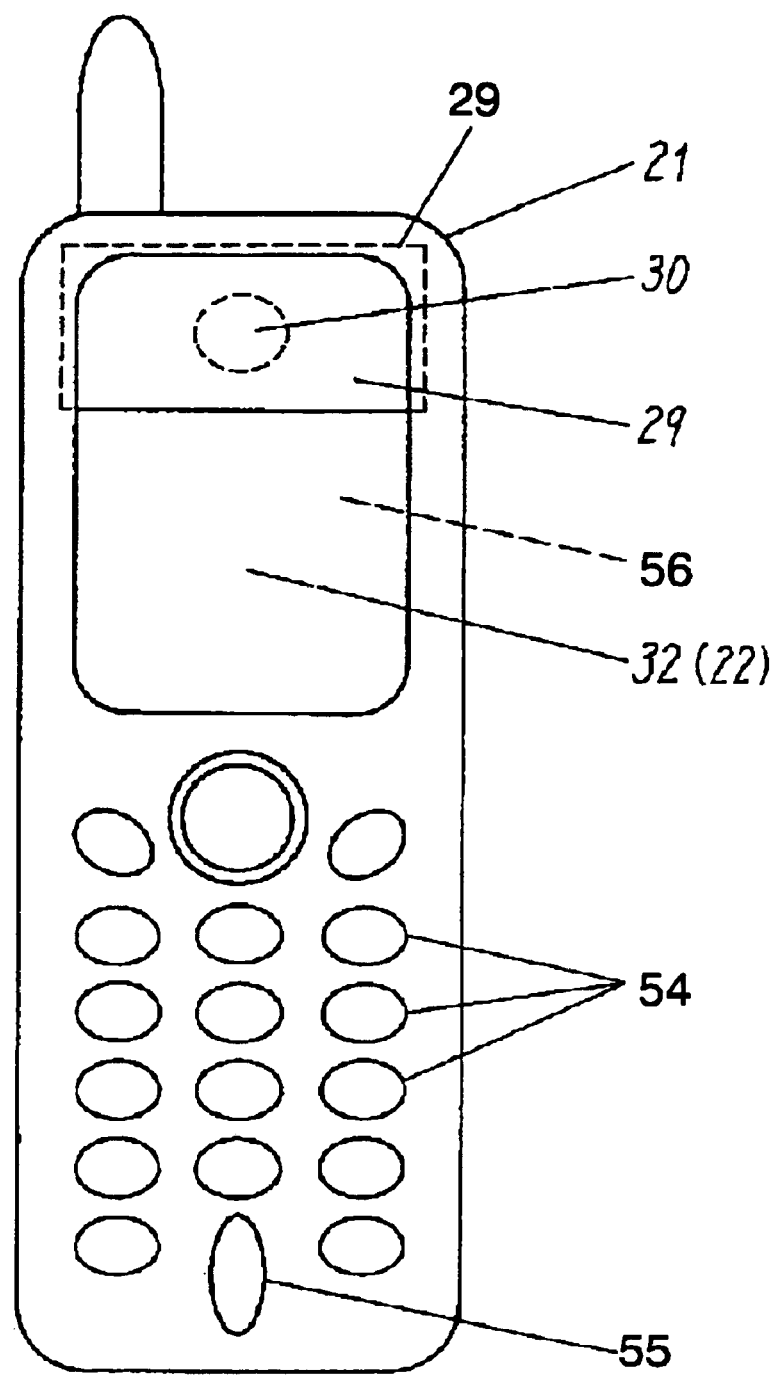
FIG. 2 is a plan view of the portable equipment of the first embodiment.

FIG. 2 is a plan view of the portable equipment.

In FIGS. 1 and 2, input element 22 is situated in the upper section of insulating resin-made housing 21.

Input element 22, which is known as the transparent touch panel, has the structure below.

In input element 22, transparent upper substrate 24 and transparent lower substrate 26 are bonded together with picture frame-like spacer 27.

Transparent upper substrate 24, which is made of polyethylene terephthalate film or the like, has transparent upper conductive layer 23 thereunder. Upper conductive layer 23 is made of indium-tin oxide, tin oxide, or the like. On the other hand, transparent lower substrate 26 has transparent lower conductive layer 25 thereon. Picture frame-like spacer 27 has an adhesive on both sides. Upper substrate 24 and lower substrate 26 are bonded together via adhesive-applied spacer 27. Besides, a plurality of spacer dots 28, which are provided at spaced intervals on the top surface of lower conductive layer 25, allow upper substrate 24 to face to lower substrate 26 at an predetermined interval.

When a user pushes the top surface of upper substrate 24 by the finger or a pen, substrate 24 bends due to the depressing force, thereby a part of upper conductive layer 23 corresponding to the pushed position contacts with lower conductive layer 25. Upper conductive layer 23 has upper electrodes (not shown) on both ends; on the other hand, lower conductive layer 25 has lower electrodes (also not shown) on both ends orthogonal to the ends having the upper electrodes of layer 23. In response to the ratio of the resistance between the upper electrodes to the resistance between the lower electrodes, the depressed position is detected.

Upper substrate 24 and upper conductive layer 23 form the input operation section. Lower conductive layer 25, lower substrate 26, and spacer 27 form the coupling section. Bonded through picture frame-like spacer 27, upper substrate 24 and lower substrate 26 have closed cavity 31 therebetween.

Disposed on the rear side of input element 22 is display element 56, such as liquid crystal display (LCD). The user finds, through transparent input element 22, letters, symbols, and graphical images shown on display element 56, and selects a desirable one among them. The user also operates input element 22 to switch between various functions.

It is noted that the upper section of housing 21 does not have a loudspeaker or the like. That is, compared to the prior-art mobile phone in which a loudspeaker is disposed on the upside of the input device, the structure of the embodiment allows input element 22 to have upwardly extended shape. This means that the transparent touch panel can be increased in size by the extended space, thereby offering a wider space for the operation to the user.

Besides, on the extended space of upper substrate 24, marking sheet 29 with letters and symbols including icons is attached. A depressing operation in the extended area is performed through marking sheet 29.

In addition, opening hole 30 that serves as a sound transmitting section is formed at the end of lower substrate 26 under marking sheet 29. In input device 32, opening hole 30 communicates with closed cavity 31 formed between upper substrate 24 and lower substrate 26 in input element 22.

Further, loudspeaker 33 as a vibration element for sound output is disposed on the rear side of opening hole 30 of input device 32. The top surface of housing 21 contains, in its lower section, a plurality of operation keys 54 each of which has a switch contact (not shown) thereunder, and microphone 55 for voice input. The mobile phone as an example of portable equipment is thus structured.

With the mobile phone having the structure above, the user can operate keys 54 to show, for example, a name and a telephone number on display element 56. Also, the user can operate input device 32 to select a desired name, telephone number, or the like, from items shown on display element 56. After that, the user pushes a confirmation key to start a call.

In placing a call, voice is entered through microphone 55. On the other hand, sound vibration generated from the voice is carried from loudspeaker 33 through opening hole 30 as the sound transmitting section and closed cavity 31 to upper substrate 24 of input element 22.

That is, the voice fed out from loudspeaker 33, as described above, travels through opening hole 30 to closed cavity 31. The conveyed voice vibrates air in closed cavity 31, thereby upper substrate 24 also vibrates. This carries the voice from upper substrate 22 of input element 24 to the outside of the equipment.

According to the embodiment of the present invention, opening hole 30 is formed between closed cavity 31 in input element 22 and loudspeaker 33 as the vibration element. Opening hole 30 serves as the sound vibration transmitting section to transmit sound vibration to closed cavity 31. Through opening hole 30 and closed cavity 31, sound vibration of sound fed from loudspeaker 33 is conveyed to upper substrate 24 of input element 22.

By virtue of input device 32 having the structure above, loudspeaker 33 can be disposed on the rear side of input element 22. It is therefore possible to provide the input device having a wide operating space. Employing the input device also encourages the downsizing of portable equipment.

Figure 3:
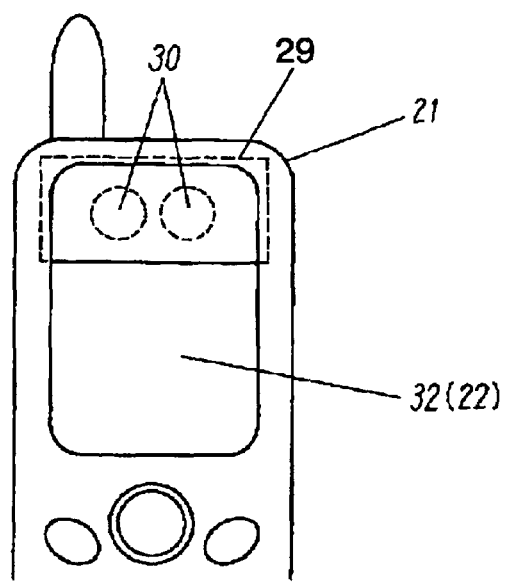
FIG. 3 is a partial plan view of the portable equipment of the first embodiment.

As shown in the partial plan view of FIG. 3, two or more opening holes 30 as the sound transmitting section may be arranged, accordingly, two or more loudspeakers 33 may be disposed on the rear side of each hole 30.

Also in this case, sound vibration of sound from a loudspeaker is transmitted to closed cavity 31. The structure with two or more loudspeakers somewhat reduces the operation space as the transparent touch panel. However, stereo effect or the like can be expected in transmitting sound vibration.

Filling closed cavity 31 with liquid including fluorine and silicon oil is also effective. This protects light reflection of the bottom surface of upper substrate 24 and the top surface of lower substrate 26. In the case that optically transparent material including a transparent touch panel is employed for the input element, filling the closed cavity, which is sandwiched between two surfaces, with liquid can block light reflection between the two surfaces. This increases light transmittance of the whole input element, accordingly, enhancing the visual recognition of display element 56 disposed on the rear side of input device 32.

In the structure having liquid-filled cavity, sound vibration from loudspeaker 33 is transmitted via the liquid to upper substrate 24.

The structure of the embodiment, as discussed above, has the sound vibration transmitting section, which conveys sound vibration fed from the input element and the vibration element disposed outside the input element, via the closed cavity. This can realize the arrangement in which the vibration element or the like is located on the back or the side surface of the input element. It is therefore possible to provide a compact input device having a wide operation space even though its downsized body.

(Second Exemplary Embodiment)

In the structure of the second embodiment, the same reference numerals have been used as in the first embodiment for similar parts, and the detailed explanation thereof will be omitted.

Figure 4:
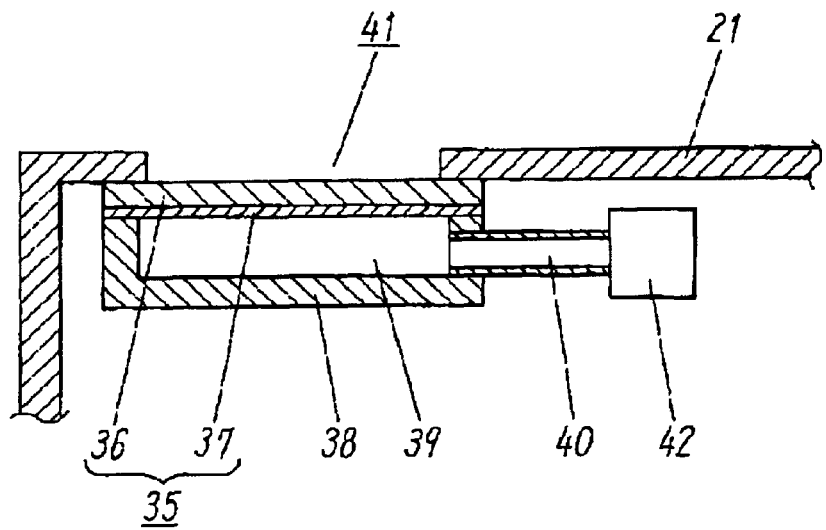
FIG. 4 is a sectional view illustrating the essential part of the portable equipment of a second embodiment.
Figure 5:
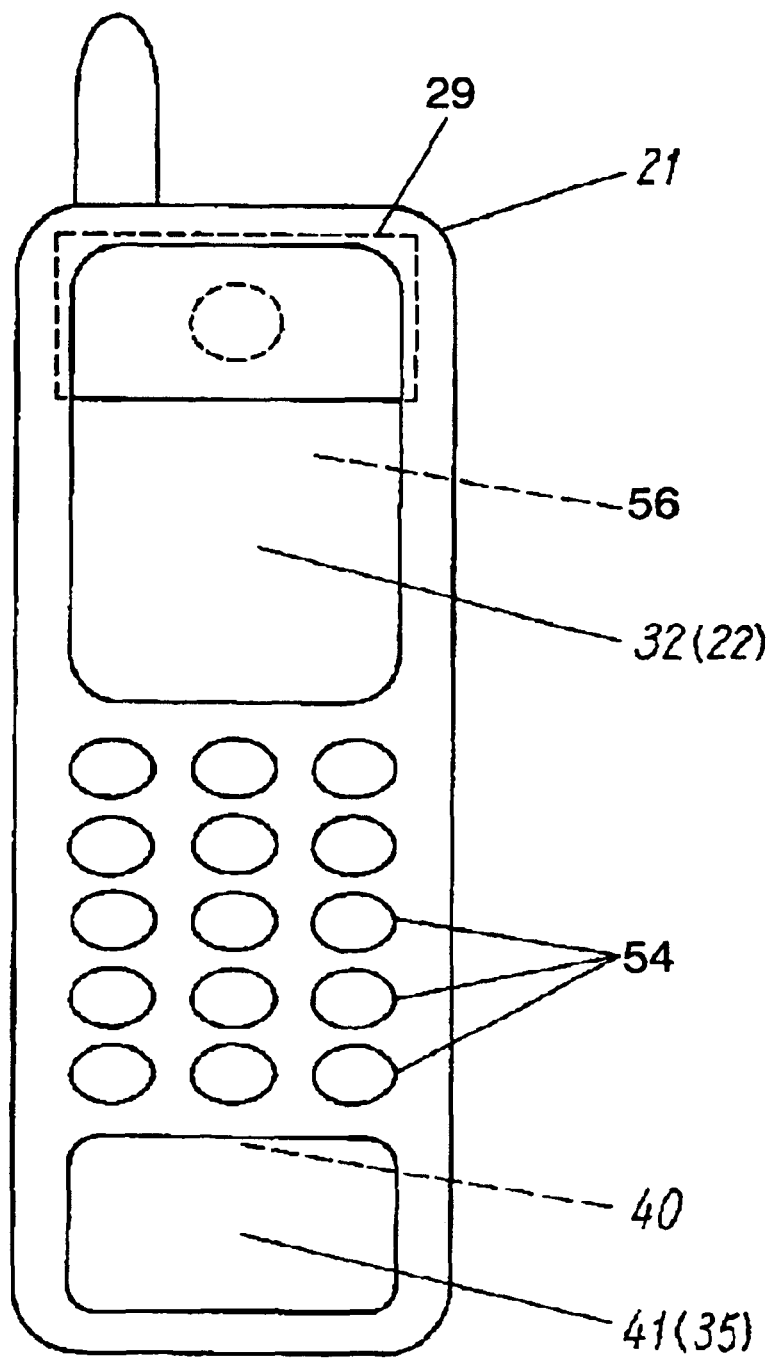
FIG. 5 is a plan view of the portable equipment of the second embodiment.

FIG. 4 is a sectional view illustrating the essential part of the portable equipment of the second embodiment. FIG. 5 is a plan view of the equipment.

Like the structure in the first embodiment, as shown in FIGS. 4 and 5, input device 32 and a plurality of operation keys 54 are arranged in the upper section of the top surface of housing 21. However, the structure differs from that of the first embodiment in that input element 35 is disposed in the lower section of housing 21. Separately disposed from input element 22, input element 35 serves as another transparent touch panel.

Input element 35, as shown in FIG. 4, is structured below.

Movable plate 36 has, on its lower surface, attached or printed pressure-sensitive layer 37.

Movable plate 36 is made of a film of polyethylene terephthalate, polycarbonate, or the like. Pressure-sensitive layer 37 is made of chloroprene rubber; silicon rubber; butadiene rubber; or the like, in which carbon is dispersed.

When a user pushes the top surface of movable plate 36 by the finger or a pen, resistance ratio between the electrodes (not shown) having orthogonal arrangement at the edges of pressure-sensitive layer 37 is detected. Input element 35 serves as the touch pad in which a depressed position is detected through the resistance ratio.

Hereinafter will be described the structure of input device 41.

Box-shaped frame 38, which functions as the coupling section, forms closed cavity 39 adjacent to input element 35 on the lower side of input element 35.

In addition, hollow tube 40 that serves as the sound vibration transmitting section is disposed on the side surface of frame 38, and one end of tube 40 is coupled with closed cavity 39.

That is, input element 35 forms the input operation section. Coupled to the input operation section, frame 38 serves as a coupler and holder of the input operation section.

Besides, microphone 42 as the vibration element for sound input is situated adjacent to the other end of hollow tube 40, which is the one opposite to the end coupling with frame 38.

The portable equipment of the embodiment has the structure above.

In such structured equipment, as is the case with the first embodiment, the user can operate keys 54 to show, for example, a name and a telephone number on display element 56. Also, the user can operate input device 32 to select a desired name, telephone number, or the like, from items shown on display element 56.

With input device 32, the user can select a desired item from the contents shown on display element 56.

As in the case of the first embodiment, input device 32 outputs sound from a loudspeaker (not shown).

On the other hand, sound is entered through input device 41. Specifically, when the user talks into input device 41, movable plate 36 of input element 35 vibrates, thereby vibrating air in closed cavity 39. The sound vibration travels through hollow tube 40, which serves as the sound vibration transmitting section, and enters in microphone 42 as the audio signal.

In the embodiment of the present invention, forming hollow tube 40 and closed cavity 39 adjacent to input element 35 allows input device 41 to capture vibration of voice or the like.

Besides, employing hollow tube 40 with a predetermined length for conveying vibration offers various forms of connection between input element 35 and microphone 42 as a vibration element disposed outside. This provides the arrangement of the vibration element including microphone 42 with flexibility.

The aforementioned structure thus offers users a wide operation space of input device 41.

Figure 6:
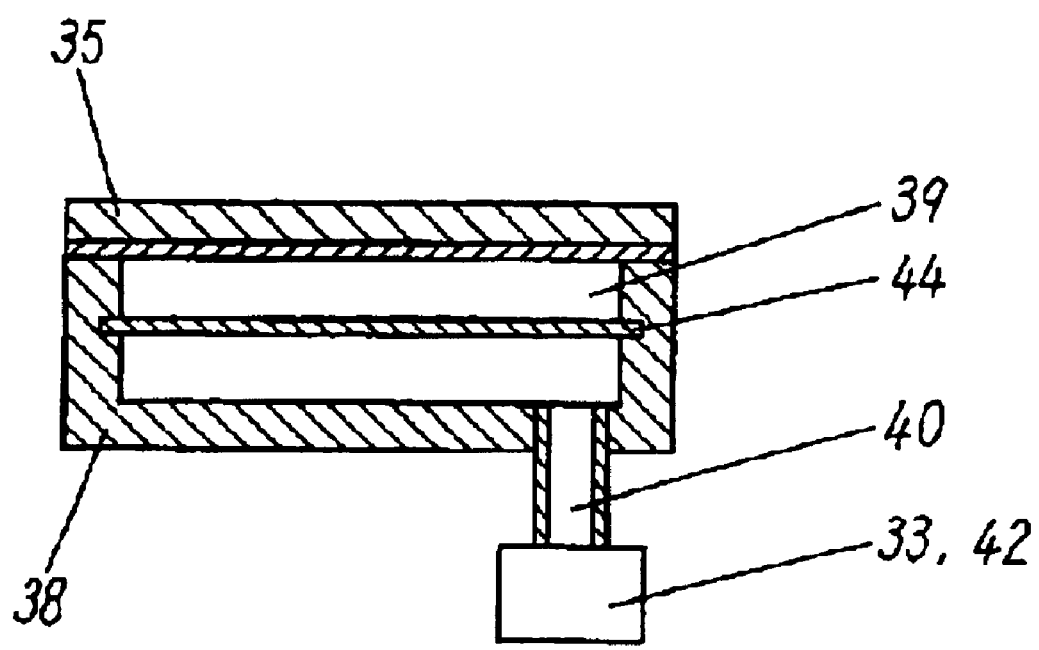
FIG. 6 is a sectional view illustrating the essential part of the portable equipment of the second embodiment.
Figure 7:
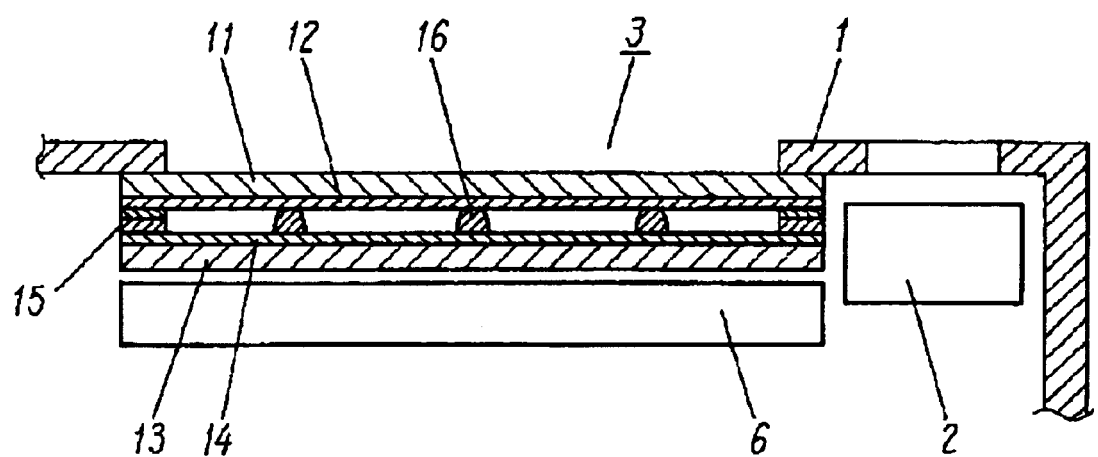
FIG. 7 is a sectional view illustrating the essential part of prior-art portable equipment.
Figure 8:
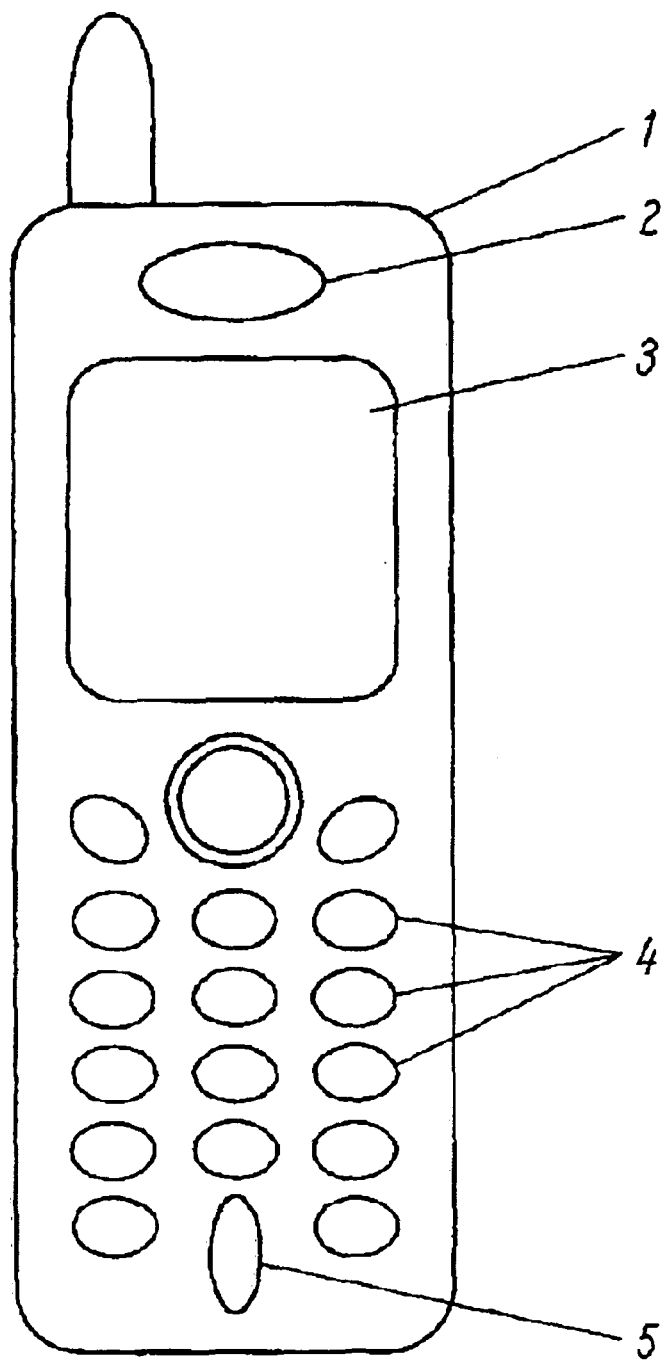
FIG. 8 is a plan view of the prior-art portable equipment.

As shown in the sectional view of FIG. 6 in which the essential part of the equipment is illustrated, frame 38 may have sheet 44 in its middle section. Sheet 44, which is made of a film of polyethylene telephthalate, polycarbonate, or the like, divides closed cavity 39 adjacent to input element 35 into several chambers.

Changing the thickness or hardness of sheet 44 can increase or decrease the intensity of vibration coming into closed cavity 39, or even can block the vibration. That is, the volume or quality of sound can be controlled, whereby a desired vibration is obtained between input element 35 and loudspeaker 33 or microphone 42.

The explanation above has been given so far on a precondition that input element 22, which is formed into a transparent touch panel, serves as input device 32, and input element 35, which is formed into a touch pad, serves as input device 41.

As another input element, a capacitive-type input element may be employed. In this case, i) prepare an upper film whose lower surface has a plurality of electrodes formed in a stripe shape, and a lower film whose upper surface has a plurality of stripe-shaped electrodes so as to be diagonal to the arrangement of the electrodes on the upper film, and then ii) bond the two films by an adhesive containing acrylic or silicon.

As still another input element, an input element in which a flexible film equipped with a strain gauge may be employed.

The structure of the embodiment, as described above, has the sound transmitting section that transmits vibration of voice or other sound, which was captured through the input element or vibration element disposed outside, via the closed cavity. Such a structure allows the vibration element or the like to be arranged at the back surface or the side surface of the input element. It is therefore possible to provide a compact input device having a wide operation space even though its downsized body.

The portable equipment of the present invention includes, as described earlier, the aforementioned input device and a sound vibration element typified by a microphone.

In the portable equipment, the sound vibration element is coupled to the sound vibration transmitting section of the input device. Sound vibration is conveyed from the input section to the vibration element (or vice versa), via the closed cavity and the sound vibration transmitting section of the input device. Such a structure can therefore provide the compact equipment having a wide operation space even though the downsized body.

Industrial Applicability

The structure of the present invention can thus offer a compact input device having a wide operation area with ease of use, and also offer portable equipment using the device.

What is claimed is:

1. An input device comprising:

an input operation section; and a coupling section that is coupled to the input operation section to form a closed cavity between the input operation section and the coupling section, wherein a sound vibration transmitting section, which is formed adjacent to the closed cavity, conveys sound vibration, via the closed cavity, any one of i) from the input operation section to the sound vibration transmitting section; and ii) from the sound vibration transmitting section to the input operation section.

2. The input device of claim 1, wherein the input operation section contains an upper substrate of a touch-panel input element; the coupling section contains a lower substrate of the touch-panel input element and a spacer; the closed cavity is formed of the upper substrate, the lower substrate, and the spacer; and the sound vibration transmitting section includes an opening section disposed in the coupling section.

3. The input device of claim 2, wherein a plurality of the sound vibration transmitting sections, through which sound vibration is conveyed, are disposed.

4. The input device of claim 2, wherein the closed cavity is filled with liquid.

5. The input device of claim 1, wherein the input operation section contains a touch-panel input element; the coupling section contains a box-shaped frame; and the closed cavity is formed of the input operation section and the box-shaped frame.

6. The input device of claim 5, wherein the sound vibration transmitting section includes a hollow tube.

7. The input device of claim 5, wherein the closed cavity is divided into a plurality of chambers.

8. The input device of claim 1, wherein a plurality of the sound vibration transmitting sections, through which sound vibration is conveyed, are disposed.

9. The input device of claim 1, wherein the sound vibration transmitting section includes a hollow tube.

10. The input device of claim 1, wherein the closed cavity is divided into a plurality of chambers.

11. The input device of claim 1, wherein the closed cavity is filled with liquid.

12. Portable equipment comprising:

a) an input device including:

a-1) an input operation section; and a-2) a coupling section that is coupled to the input operation section to form a closed cavity between the input operation section and the coupling section, wherein a sound vibration transmitting section, which is formed adjacent to the closed cavity, conveys sound vibration, via the closed cavity, any one of i) from the input operation section to the sound vibration transmitting section; and ii) from the sound vibration transmitting section to the input operation section; and b) a sound vibration element that is coupled to the sound vibration transmitting section, wherein sound vibration is transmitted, via the closed cavity, any one of i) from the input operation section to the sound vibration element; and ii) from the sound vibration element to the input operation section.

* * * * *